(12) United States Patent
Crawford et al.

(10) Patent No.: US 11,140,186 B2
(45) Date of Patent: Oct. 5, 2021

(54) IDENTIFICATION OF DEVIANT ENGINEERING MODIFICATIONS TO PROGRAMMABLE LOGIC CONTROLLERS

(71) Applicant: SIEMENS AKTIENGESELLSCHAFT, Munich (DE)

(72) Inventors: John W. Crawford, Cumming, GA (US); Kaan Bardak, Lawrence Township, NJ (US); Martin Kunz, Duluth, GA (US); Lesley Morgan, Johnson City, TN (US); Nicholas Nichols, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 319 days.

(21) Appl. No.: 16/337,270

(22) PCT Filed: Sep. 30, 2016

(86) PCT No.: PCT/US2016/054694
§ 371 (c)(1),
(2) Date: Mar. 27, 2019

(87) PCT Pub. No.: WO2018/063296
PCT Pub. Date: Apr. 5, 2018

(65) Prior Publication Data
US 2020/0036737 A1 Jan. 30, 2020

(51) Int. Cl.
*H04L 29/06* (2006.01)
*G05B 19/05* (2006.01)
*G06F 21/55* (2013.01)

(52) U.S. Cl.
CPC ........ *H04L 63/1425* (2013.01); *G05B 19/056* (2013.01); *G06F 21/554* (2013.01); *H04L 63/1416* (2013.01); *H04L 63/20* (2013.01)

(58) Field of Classification Search
CPC . H04L 63/1425; H04L 63/1416; H04L 63/20; G05B 19/056; G05B 2219/23464; G05B 19/058; G06F 21/554; G06F 21/552
(Continued)

(56) References Cited

U.S. PATENT DOCUMENTS 8,667,589 B1 * 3/2014 Saprygin ............. H04L 63/1425
726/23
9,794,278 B1 * 10/2017 Leita ...................... G06N 7/005
(Continued)

FOREIGN PATENT DOCUMENTS

EP 2711797 A1 3/2014

OTHER PUBLICATIONS

PCT International Search Report and Written Opinion of International Searching Authority dated Jun. 16, 2017 corresponding to PCT International Application No. PCT/US2016/054694 filed Sep. 30, 2016.

*Primary Examiner* — Badri Narayanan Champakesan

(57) ABSTRACT

Embodiments include methods, network security computer systems, and computer program products for identifying deviant engineering modifications to programmable logic controllers. Aspects include: collecting, by a network traffic collection device of the network security computer, network traffic data from one or more engineering stations, and storing, by a network traffic data storage device, the network traffic data collected. Each of the engineering stations may include one or more programmable logic controllers. The method also may include: comparing, by a network traffic comparison module, the network traffic data collected, detecting, by an abnormality detection module, any deviant engineering modifications to the programmable logic controllers in the engineering stations; and generating, by an alarming and correction module, one or more reports for the deviant engineering modifications to programmable logic
(Continued)

controllers. The alarming and correction module may generate one or more alarms and block any network traffic associated with the deviant engineering modifications.

9 Claims, 4 Drawing Sheets

(58) Field of Classification Search
USPC .......................................................... 726/22
See application file for complete search history.

(56) References Cited

U.S. PATENT DOCUMENTS

| | | | |
|---|---|---|---|
| 10,250,619 B1* | 4/2019 | Park | H04L 63/18 |
| 2009/0254572 A1* | 10/2009 | Redlich | G06Q 10/06 |
| 2011/0016525 A1* | 1/2011 | Jeong | H04L 63/1425 |
| | | | 726/23 |
| 2015/0301515 A1* | 10/2015 | Houmb | H04L 63/1425 |
| | | | 700/108 |
| 2015/0346706 A1* | 12/2015 | Gendelman | G05B 19/058 |
| | | | 700/79 |
| 2016/0028693 A1* | 1/2016 | Crawford | H04L 63/0281 |
| | | | 726/12 |
| 2016/0034688 A1 | 2/2016 | Schoenemann | |
| 2016/0232105 A1* | 8/2016 | Goss | H04L 9/3236 |
| 2016/0261482 A1* | 9/2016 | Mixer | H04L 63/00 |
| 2017/0078322 A1* | 3/2017 | Seiver | H04L 41/12 |
| 2017/0093910 A1* | 3/2017 | Gukal | H04L 63/1425 |
| 2017/0126745 A1* | 5/2017 | Taylor | H04L 63/0227 |
| 2017/0244752 A1* | 8/2017 | Gordeychik | H04L 67/1095 |
| 2017/0293757 A1* | 10/2017 | Rosenman | H04L 63/1433 |
| 2017/0302691 A1* | 10/2017 | Singh | H04L 63/1408 |

\* cited by examiner

IDENTIFICATION OF DEVIANT ENGINEERING MODIFICATIONS TO PROGRAMMABLE LOGIC CONTROLLERS

TECHNICAL FIELD

The present invention relates generally to network security, and more particularly to methods, systems, and computer program products for identifying deviant engineering modifications to programmable logic controllers by analysis of network traffic content and timing patterns.

BACKGROUND

An industrial automation control network is a system of interconnected equipment used to monitor and control physical equipment in industrial environments. These networks differ quite significantly from traditional enterprise networks due to the specific requirements of their operation. For example, network traffic between engineering stations having programmable logic controllers has unique formats, distinct features, and identifiable timing patterns. Despite the functional differences between industrial and enterprise networks, a growing integration between the two has been observed.

Industrial automation control networks are increasingly interconnected, and they are targeted by malicious software and other threats. The malicious software and other threats can be introduced into any industrial automation control network either through network interconnections, or through a USB flash drive for a closed network. "Stuxnet" is a typical example of malicious computer malware introduced through a USB flash drive. The malicious computer malware can disrupt computer operations, gather sensitive information, gain access to an industrial automation control network, modify computer executable instructions to the programmable logic controllers, display unwanted advertising, and sometimes demand ransoms. Malicious threats can have a range of consequences, from minor inconvenience, to equipment and plant damage, to bodily harm and even loss of life, to massive damage beyond the confines of the industrial automation network itself. Therefore, it has become necessary to develop means and methods to detect behaviors that could have an impact on the integrity of such systems.

Therefore, heretofore unaddressed needs still exist in the art to address the aforementioned deficiencies and inadequacies.

SUMMARY

In one aspect, the present invention relates to a method for identifying deviant engineering modifications to programmable logic controllers. In certain embodiments, the method includes: collecting, by a network traffic collection device of a network security computer, network traffic data from one or more engineering stations, and storing, by a network traffic data storage device of the network security computer, the network traffic data collected. Each of the engineering stations may include one or more programmable logic controllers. The method also may include: comparing, by a network traffic comparison module of the network security computer, the network traffic data collected, detecting, by an abnormality detection module of the network security computer, any deviant engineering modifications to the programmable logic controllers in the engineering stations; and generating, by an alarming and correction module of the network security computer, one or more reports for the deviant engineering modifications to the programmable logic controllers.

In another aspect, the present invention relates to a network security computer for identifying deviant engineering modifications to programmable logic controllers. The network security computer includes: at least one processor, and a non-transitory storage medium storing an operating system, a network security program, and computer executable instructions. When executed by at least one processor, the network security program causes the processor to identify deviant engineering modifications to programmable logic controllers. The network security program may include: a network traffic collection device, a network traffic comparison module, a network traffic data storage device, an abnormality detection module, and an alarming and correction module. The network traffic collection device collects network traffic data from one or more engineering stations. The network traffic data storage device stores the collected network traffic data and the network traffic data templates (benchmark data) collected during engineering time. The network traffic comparison module compares the network traffic data collected with the network traffic data templates collected during engineering time. The abnormality detection module detects any deviant engineering modifications to the programmable logic controllers in the engineering stations. The alarming and correction module generates one or more reports for the deviant engineering modifications to the programmable logic controllers.

In yet another aspect, the present invention relates to a computer program product operable on a network security computer. In certain embodiments, the computer program product includes a non-transitory computer storage medium readable by at least one processor of the network security computer. The non-transitory computer storage medium stores an operating system, a network security program, and computer executable instructions for execution by the processor of the network security computer for performing a method for identifying deviant engineering modifications to programmable logic controllers. In certain embodiments, the method includes: collecting, by a network traffic collection device of a network security computer, network traffic data from one or more engineering stations, and storing, by a network traffic data storage device of the network security computer, the network traffic data collected. Each of the engineering stations may include one or more programmable logic controllers. The method also may include: comparing, by a network traffic comparison module of the network security computer, the network traffic data collected, detecting, by an abnormality detection module of the network security computer, any deviant engineering modifications to the programmable logic controllers in engineering stations; and generating, by an alarming and correction module of the network security computer, one or more reports for the deviant engineering modifications to the programmable logic controllers.

These and other aspects of the present invention will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the present invention is particularly pointed out and distinctly claimed in the claims at the conclusion of the specification. The foregoing and other features and advantages of the present invention are apparent from the following detailed description taken in conjunction with the accompanying drawings in which:

DETAILED DESCRIPTION

Figure 1:
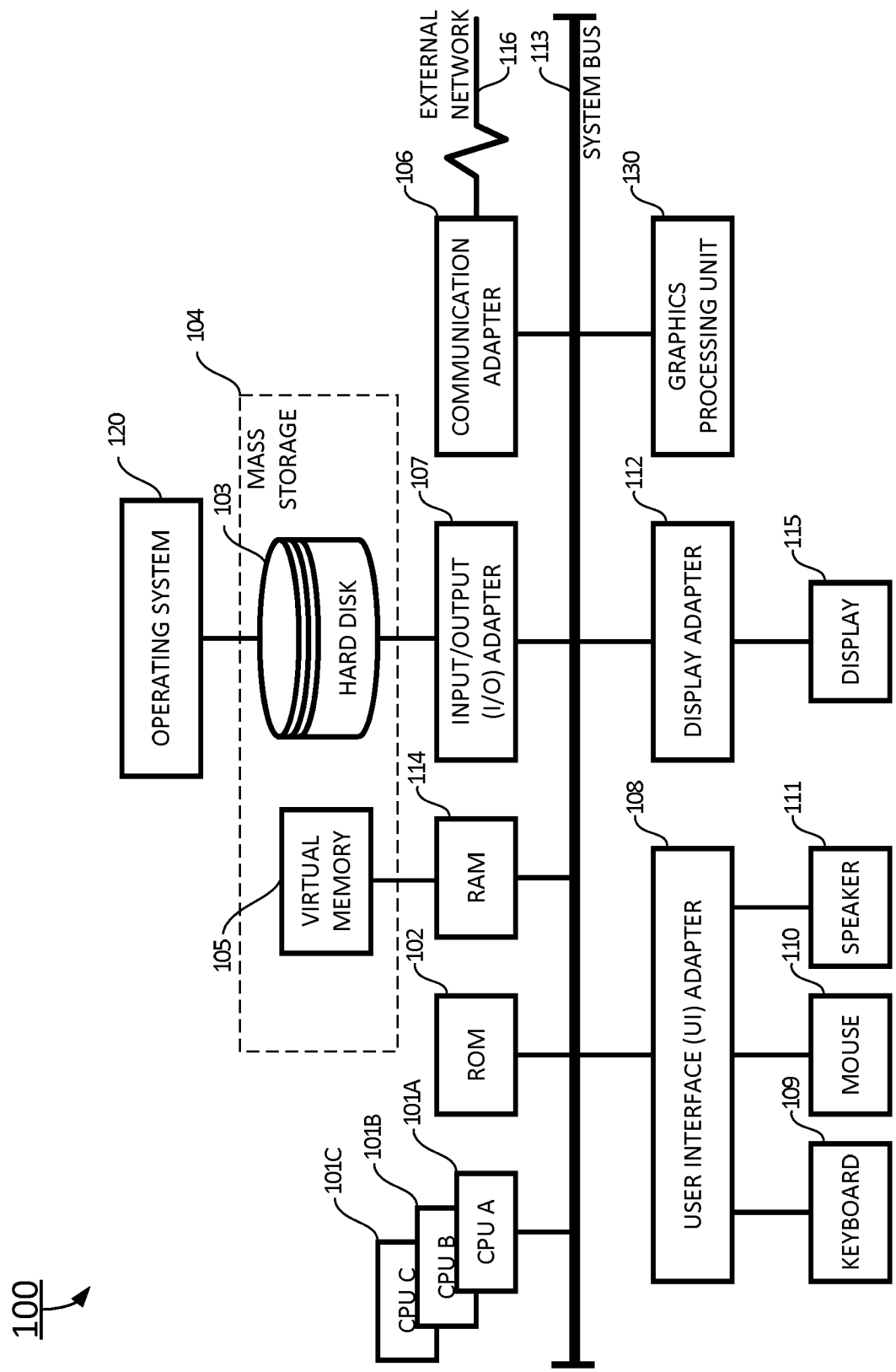
FIG. 1 is a block diagram illustrating an exemplary network security computer system for identifying deviant engineering modifications to programmable logic controllers according to certain embodiments of the present invention.

The present invention is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

The term computer program, as used above, may include software, firmware, and/or microcode, and may refer to programs, routines, functions, classes, and/or objects. The term shared, as used above, means that some or all code from multiple modules may be executed using a single (shared) processor.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present invention will now be described more fully hereinafter with reference to the accompanying drawings FIGS. 1-4, in which certain exemplary embodiments of the present invention are shown. The present invention may, however, be embodied in many different forms and should not be construed as limited to the embodiments set forth herein; rather, these embodiments are provided so that this disclosure will be thorough and complete, and will fully convey the scope of the disclosure to those skilled in the art.

Referring to FIG. 1, an embodiment of a computer system 100 of identifying deviant engineering modifications to programmable logic controllers and implementing the teachings herein. In this embodiment, the computer system 100 has one or more central processing units (CPU, or processors) 101A, 101B, 101C, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of the computer system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or virtual tape storage drive 105 or any other similar component. I/O adapter 107, hard disk 103, and virtual tape storage device 105 are collectively referred to herein as mass storage 104. Operating system 120 for execution on the computer system 100 may be stored in mass storage 104. A network adapter 106 interconnects bus 113 with an external network 116 enabling the computer system 100 to communicate with other such systems. A screen (e.g., a display monitor) 115 is connected to system bus 113 by display adaptor 112, which may include a graphics adapter to improve the performance of graphics intensive applications, and a video controller. In one embodiment, adapters 107, 106, and 112 may be connected to one or more I/O buses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 are interconnected to bus 113 via user interface adapter 108, which may include, for example, a Super I/O chip integrating multiple device adapters into a single integrated circuit.

In exemplary embodiments, the computer system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the computer system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1. In certain embodiments, the network 116 may include a symmetric multiprocessing (SMP) bus, a Peripheral Component Interconnect (PCI) bus, local area network (LAN), wide area network (WAN), telecommunication network, wireless communication network, and the Internet.

Conventionally, malicious software and other threats can be introduced into an industrial automation control network either through network interconnections, or through a USB flash drive for a closed network. Once the malicious software is introduced into a network, the operation of the malicious software will change the network behavior and create network traffic that is not native to the environment of the industrial automation control network. Therefore, it is desirable to create a network security system that can recognize such network behavior change through monitoring the network traffic, analyzing the monitored network traffic data and timing patterns, and identifying any deviant engineering modifications to programmable logic controllers operating in one or more engineering stations.

Figure 2:
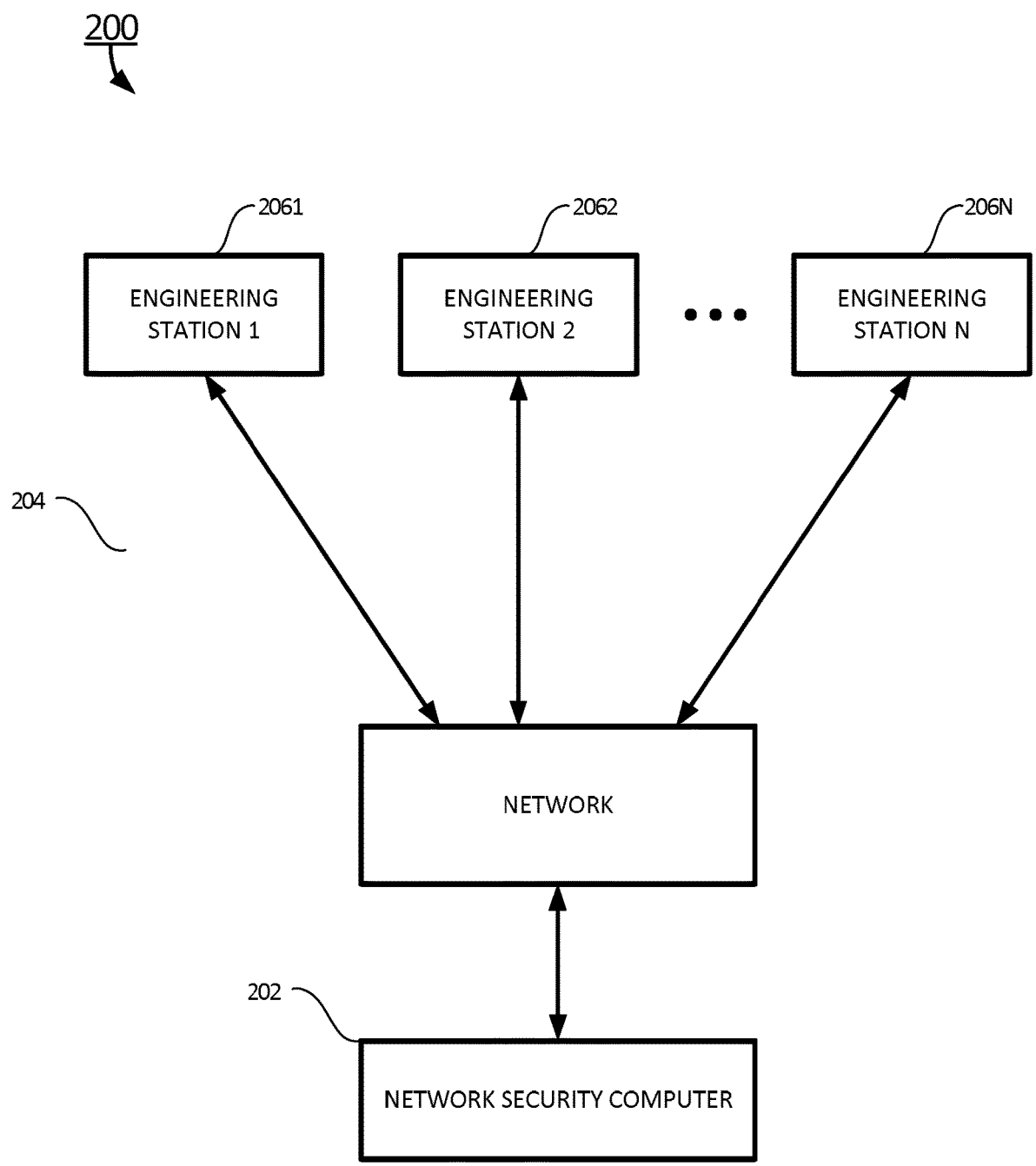
FIG. 2 is a block diagram of an exemplary industrial automation control and network security system having multiple engineering stations connected to the network security computer according to certain exemplary embodiments of the present invention.

Referring now to FIG. 2, a block diagram of an exemplary industrial automation control and network security system 200 having multiple engineering stations connected to a network security computer 202 is shown according to certain exemplary embodiments of the present invention. The industrial automation control and network security system 200 includes N engineering stations: 2061, 2062, . . . , and 206N, where N is a positive integer. These engineering stations are connected through an industrial automation control network 204. In certain embodiments, the industrial automation control network 204 may include a symmetric multiprocessing (SMP) bus, a Peripheral Component Interconnect (PCI) bus, local area network (LAN), wide area network (WAN), telecommunication network, wireless communication network, and the Internet.

In certain embodiments, the industrial automation control and network security system 200 includes the network security computer 202 for identifying deviant engineering modifications to programmable logic controllers in the engineering stations: 2061, 2062, . . . , and 206N. The network security computer 202 is connected to the industrial automation control network 204. Any network traffic among the engineering stations: 2061, 2062, . . . , and 206N may be collected by the network security computer 202 through the industrial automation control network 204.

Figure 3:
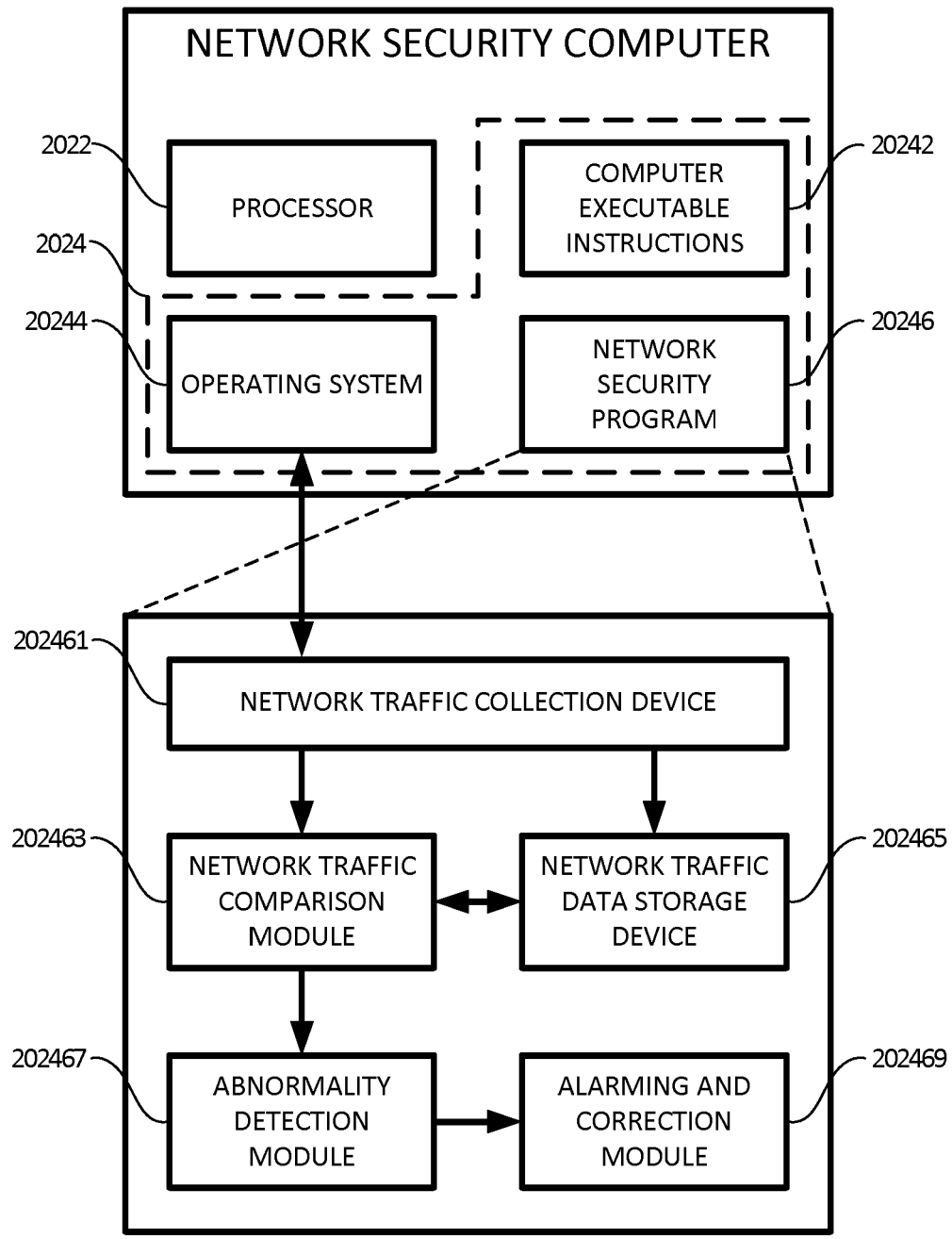
FIG. 3 is a block diagram of an exemplary network security computer having a network security program for identifying deviant engineering modifications to programmable logic controllers according to certain exemplary embodiments of the present invention.

In one aspect, the present invention relates to the network security computer 202 for identifying deviant engineering modifications to programmable logic controllers, as shown in FIG. 3. In certain embodiments, the network security computer 202 includes: at least one processor 2022, and a non-transitory storage medium 2024. The non-transitory storage medium 2024 stores an operating system 20244, a network security program 20246, and computer executable instructions 20242. When executed by at least one processor 2022, the network security program 20246 causes the processor 2022 to identify deviant engineering modifications to programmable logic controllers in the engineering stations: 2061, 2062, . . . , and 206N.

In certain embodiments, the network security program 20246 may include: a network traffic collection device 202461, a network traffic comparison module 202463, a network traffic data storage device 202465, an abnormality detection module 202467, and an alarming and correction module 202469.

The network traffic collection device 202461 collects network traffic data from one or more engineering stations 2061, . . . , 206N. In one embodiment, the network traffic collection device 202461 is a hardware network traffic sniffing tool. In another embodiment, the network traffic collection device 202461 is network traffic monitoring and sniffing software for real-time operational intelligence. Such software tools provides the ability to quickly and securely collect, search, analyze, and visualize extremely large streams of machine data generated by the industrial automation control network 204 and technology infrastructure—physical, virtual and cloud-based. In certain embodiments, the network traffic data collected by the network traffic collection device 202461 may also include tools to separate certain types of network traffic data, and keep only the network traffic data related to the identification of deviant engineering modifications of programmable logic controllers. For example, network traffic data traffic between one programmable logic controller and another programmable logic controller may be collected and stored, and network traffic data that is not related to the communication and/or execution of industrial automation network may be discarded in order to dramatically reduce the amount of network traffic data collected.

The network traffic data storage device 202465 stores two sets of network traffic data. The first set of network traffic data includes the network traffic data collected through the network traffic collection device 202461, and the second set of network traffic data includes network traffic data templates collected during engineering time. The network traffic data between programmable logic controllers is specific and unique, and certain signatures of the network traffic data may be referred to as the fingerprint of the network traffic data. Therefore, during engineering time or the design stage of the engineering stations having programmable logic controllers, these signatures are collected and stored in the network traffic data storage device 202465 as network traffic benchmark data templates such that the network traffic data collected by the network traffic collection device 202461 may be analyzed and compared to the network traffic data template stored in the network traffic data storage device 202465 in order to detect and identify any deviant engineering modifications to the programmable logic controllers.

A template is a data model that describes the structure of valid network data, including metadata about the variability and legal syntax of the data structure's contents. The identification system utilizes these templates, either manually constructed or automatically derived, to perform classification of the data and compute statistics regarding confidence of such classification. As such, the template is used as a benchmark against operational network data to classify data as valid (confidence=100%), potentially invalid (confidence <100%), or invalid (confidence=100%) and provide a confidence measure related to the classification.

In certain embodiments, the network traffic data storage device 202465 may also include an external configuration module. The external configuration module may be configured to manually or automatically set up the templates that reflect benchmarks and what is considered normal. The external configuration module may also be configured to update signatures and special features such that more templates and benchmarks may be added into the network traffic data storage device 202465 as the technologies evolve.

The network traffic comparison module 202463 analyzes the first set of network traffic data collected through the network traffic collection device 202461, and compares the first set of network traffic data with the second set of network traffic data templates collected during engineering time. In certain embodiments, the network traffic comparison module 202463 comprises the content of the first set of network traffic data collected with the content of the second set of network traffic data templates stored in the network traffic data storage device 202465, and the timing patterns of the first set of network traffic data collected with the timing patterns of the second set of network traffic data templates stored in the network traffic data storage device 202465.

The abnormality detection module 202467 analyzes the results of the comparisons made by the network traffic comparison module 202463, and then detects any deviant engineering modifications to the programmable logic controllers in the engineering stations. The abnormality detection module 202467 of the network security computer 202 detects any deviant engineering modifications to one or more programmable logic controllers in the engineering stations when the difference between the content of network traffic data collected and the content of network traffic data templates stored in the network traffic data storage device 202465 exceeds a first predetermined threshold, and/or when the difference between the timing patterns of network traffic data collected and the timing patterns of network traffic data templates stored in the network traffic data storage device 202465 exceeds a second predetermined threshold.

In one embodiment, the alarming and correction module 202469 generates one or more reports to an operator of the network security computer 202 regarding the deviant engineering modifications to the programmable logic controllers. In another embodiment, the alarming and correction module 202469 generates one or more alarms and sends the one or more alarms generated to the operator of the network security computer 202 when any deviant engineering modifications to a programmable logic controller is detected. The one or more reports and/or alarms generated may be communicated to the operator through, for example, one or more emails, one or more text messages, one or more displays on the network security computer 202, and/or one or more alarm displays on the engineering stations.

In certain embodiments, when any deviant engineering modification to a programmable logic controller is detected and the source of the network traffic is identified, the alarming and correction module 202469 may block network traffic associated with the deviant engineering modifications to the programmable logic controllers.

In another aspect, the present invention relates to a method for identifying deviant engineering modifications to programmable logic controllers. In certain embodiments, the method includes: collecting, by a network traffic collection device 202461 of a network security computer 202, network traffic data from one or more engineering stations 2061, . . . , 206N, and storing, by a network traffic data storage device 202465 of the network security computer 202, the network traffic data collected. Each of the engineering stations 2061, . . . , 206N may include one or more programmable logic controllers.

The method also may include: comparing, by a network traffic comparison module 202463 of the network security computer 202, the network traffic data collected; detecting, by an abnormality detection module 202467 of the network security computer 202, any deviant engineering modifications to the programmable logic controllers in the engineering stations; and generating, by an alarming and correction module 202469 of the network security computer 202, one or more reports for the deviant engineering modifications to the programmable logic controllers.

In certain embodiments, the method may also include: storing, by the network traffic data storage device 202465 of the network security computer 202, the network traffic data collected during engineering time as templates to form standard data formats and features to be used as a benchmark for comparison. The network traffic data collected includes at least: content of the network traffic data and timing patterns of the network traffic data.

In one embodiment, the network traffic comparison module 202463 of the network security computer 202 compares the content of the network traffic data collected with the content of network traffic data templates stored in the network traffic data storage device 202465. In another embodiment, the network traffic comparison module 202463 of the network security computer 202 compares the timing patterns of the network traffic data collected with the timing patterns in the network traffic data templates stored in the network traffic data storage device 202465. In yet another embodiment, the network traffic comparison module 202463 of the network security computer 202 compares both the content and the timing patterns of the network traffic data with the content and the timing patterns of network traffic data templates stored in the network traffic data storage device 202465.

In certain embodiments, the abnormality detection module 202467 of the network security computer 202 identifies any deviant engineering modifications to one or more programmable logic controllers in the engineering stations when the difference between the content of network traffic data collected and the content of network traffic data templates stored in the network traffic data storage device 202465 exceeds a predetermined threshold for the network traffic data content, and/or when the difference between the timing patterns of network traffic data collected and the timing patterns of network traffic data templates stored in the network traffic data storage device 202465 exceeds a predetermined threshold for the network traffic data timing patterns.

In certain embodiments, the alarming and correction module 202469 of the network security computer 202 generates one or more alarms to an operator of the network security computer 202 when any deviant engineering modifications to the programmable logic controllers are detected. The one or more alarms may be communicated to the operator through, for example: one or more emails, one or more text messages, one or more displays on the network security computer 202, and one or more alarm displays on the engineering stations. The alarming and correction module 202469 of the network security computer 202 may also block any network traffic associated with the deviant engineering modification to a programmable logic controller when any deviant engineering modification to a programmable logic controller is detected and the source of the network traffic is identified.

Figure 4:
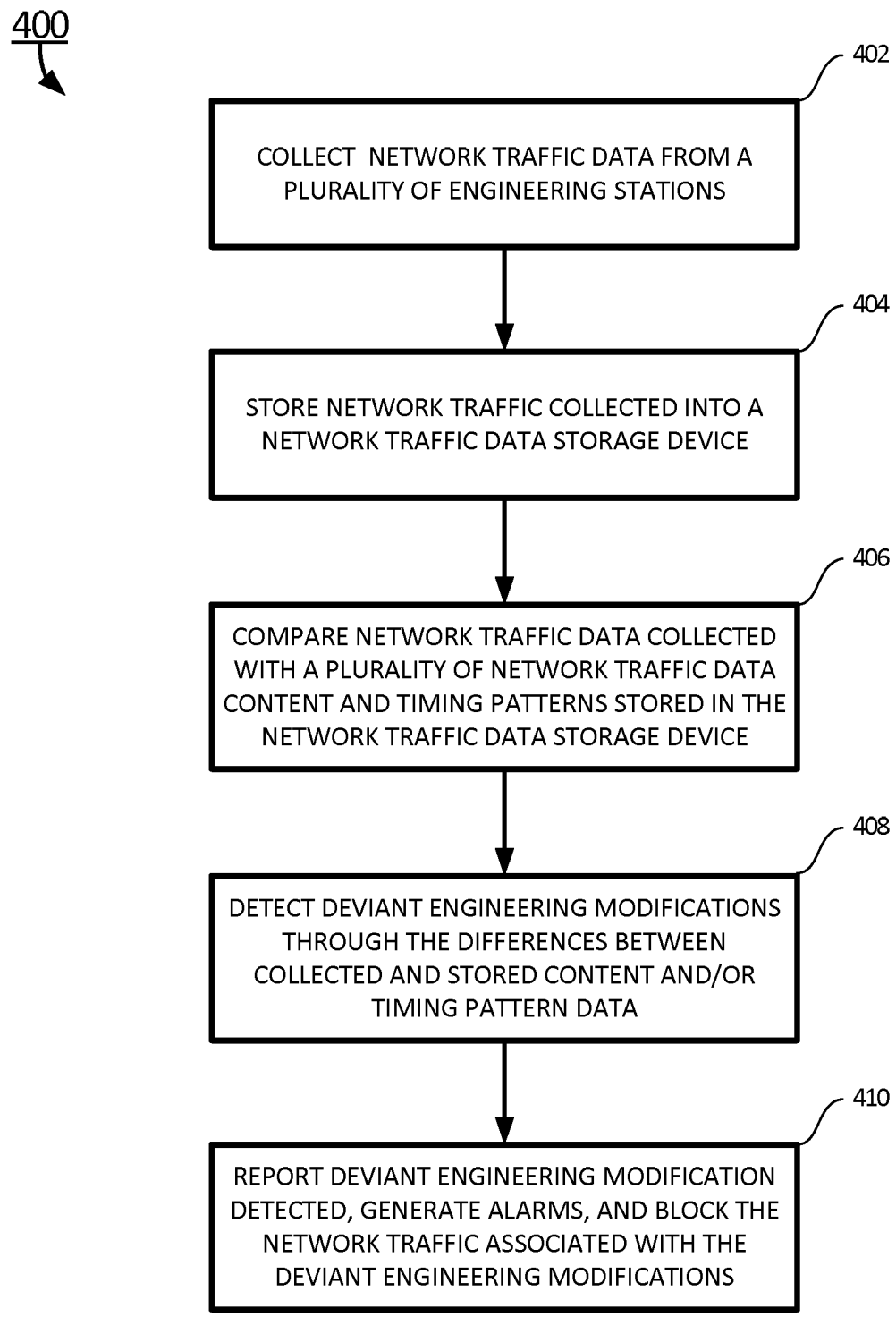
FIG. 4 is a flow chart of an exemplary method of identifying deviant engineering modifications to programmable logic controllers according to certain exemplary embodiments of the present invention.

Referring now to FIG. 4, a flow chart of an exemplary method 400 of identifying deviant engineering modifications to programmable logic controllers is shown according to certain exemplary embodiments of the present invention.

At block 402, the network traffic collection device 202461 of the network security computer 202 collects network traffic data from one or more engineering stations 2061, ..., 206N. In one embodiment, the network traffic collection device 202461 is a hardware network traffic sniffing tool. In another embodiment, the network traffic collection device 202461 is network traffic monitoring and sniffing software. The network traffic collection device 202461 collects, searches, analyzes and visualizes the massive streams of machine data generated by the industrial automation control network 204 and technology infrastructure—physical, virtual and in the cloud. In certain embodiments, the network traffic data collected by the network traffic collection device 202461 may also include tools to separate certain types of network traffic data, and retain only the network traffic data related to the identification of deviant engineering modifications of programmable logic controllers.

At block 404, the network traffic data storage device 202465 stores the first set of network traffic data collected through the network traffic collection device 202461. In certain embodiments, the network traffic data storage device 202465 also stores the second set of network traffic data templates collected by the network traffic collection device 202461 during engineering time or design phase of the engineering stations. The network traffic data template represents standard formats, features and signatures of the network traffic data between the engineering stations, and can be used as a benchmark to detect and identify any deviant engineering modifications to the programmable logic controllers.

At block 406, the network traffic comparison module 202463 analyzes the first set of network traffic data collected through the network traffic collection device 202461, and compares the first set of network traffic data with the second set of network traffic data templates collected during engineering time. In one embodiment, the network traffic comparison module 202463 comprises the content of the first set of network traffic data collected with the content of the second set of network traffic data templates stored in the network traffic data storage device 202465. In another embodiment, the network traffic comparison module 202463 comprises the timing patterns of the first set of network traffic data collected with the timing patterns of the second set of network traffic data templates stored in the network traffic data storage device 202465. In yet another embodiment, the network traffic comparison module 202463 comprises both the content and the timing patterns of the first set of network traffic data collected with the content and the timing patterns of the second set of network traffic data templates stored in the network traffic data storage device 202465.

In certain embodiments, the network traffic comparison module 202463 can also make use of certain technologies used by antivirus scanners such as signature scanning, integrity checkers, activity blockers and heuristics scanners. The use of specific signature scanners can be very effective since automation environment are relatively static. Network security engineers usually know certain characteristics of the engineering software which is different from known Hacker Software mimicking their commands. In addition changes in such environment are governed by guidelines and the asset owners should know when changes can take place. This information can be stored and configured to improve the detection results.

At block 408, the abnormality detection module 202467 analyzes the results of the comparisons made by the network traffic comparison module 202463, and detects any deviant engineering modifications to the programmable logic controllers in the engineering stations. The abnormality detection module 202467 of the network security computer 202 detects any deviant engineering modifications to one or more programmable logic controllers in the engineering stations when the difference between the content of network traffic data collected and the content of network traffic data templates stored in the network traffic data storage device 202465 exceeds a first predetermined threshold, and/or when the difference between the timing patterns of network traffic data collected and the timing patterns of network traffic data templates stored in the network traffic data storage device 202465 exceeds a second predetermined threshold.

At block 408, in one embodiment, the alarming and correction module 202469 generates one or more reports to an operator of the network security computer 202 for the deviant engineering modifications to the programmable logic controllers. In another embodiment, the alarming and correction module 202469 generates one or more alarms and sends the one or more alarms generated to the operator of the network security computer 202 when any deviant engineering modifications to the programmable logic controllers are detected. The one or more reports and/or alarms generated may be sent to the operator through one or more emails, one or more text messages, one or more display on the network security computer 202, and/or one or more alarm display on the engineering stations.

In certain embodiments, when any deviant engineering modifications to the programmable logic controllers are detected and the sources of the network traffic are identified, the alarming and correction module 202469 may block network traffic associated with the deviant engineering modifications to the programmable logic controllers.

In yet another aspect, the present invention relates to a computer program product operable on a network security computer 202. In certain embodiments, the computer program product includes a non-transitory computer storage medium 2024 readable by at least one processor 2022 of the network security computer 202. The non-transitory computer storage medium 2024 stores an operating system 20244, a network security program 20246 and computer executable instructions 20242 for execution by the processor 2022 of the network security computer 202 for performing a method for identifying deviant engineering modifications to programmable logic controllers. In certain embodiment, the method includes: collecting, by a network traffic collection device 202461 of a network security computer 202, network traffic data from one or more engineering stations 2061, ..., 206N, and storing, by a network traffic data storage device 202465 of the network security computer 202, the network traffic data collected. Each of the engineering stations 2061, ..., 206N may include one or more programmable logic controllers. The method also may include: comparing, by a network traffic comparison module 202463 of the network security computer 202, the network traffic data collected; detecting, by an abnormality detection module 202467 of the network security computer 202, any deviant engineering modifications to the programmable logic controllers in the engineering stations; and generating, by an alarming and correction module 202469 of the network security computer 202, one or more reports for the deviant engineering modifications to the programmable logic controllers.

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions available for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being composed of transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise, but not be limited to, copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be, but not be limited to, assembler instructions, instruction-set-architecture (ISA) instructions, machine instructions, machine dependent instructions, microcode, firmware instructions, state-setting data, or either source code or object code written in any combination of one or more programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, but not limited to, programmable logic circuitry, field-programmable gate arrays (FPGA), or programmable logic arrays (PLA), may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for identifying deviant engineering modifications to a plurality of programmable logic controllers, comprising:
    collecting, by a network traffic collection device of a network security computer, network traffic data from a plurality of engineering stations, each engineering station comprising at least one programmable logic controller, wherein the plurality of engineering stations are connected through an industrial automation control network, and wherein the network traffic data comprise streams of machine data generated by the industrial automation control network and technology infrastructure;
    storing, by a network traffic data storage device of the network security computer, the network traffic data collected, wherein the storing comprises:
        storing a first set of network traffic data collected during engineering or design of the plurality of engineering stations, wherein signatures of the first set of network traffic data are collected and stored as network traffic benchmark data templates, and
        storing a second set of network traffic data collected during operation of the plurality of engineering stations;
    comparing, by a network traffic comparison module of the network security computer, the first set of network traffic data with the second set of network traffic data;
    detecting, by an abnormality detection module of the network security computer, any deviant engineering modifications to the plurality of programmable logic controllers in the plurality of engineering stations based on the comparing of the first set of network traffic data with the second set of network traffic data; and
    generating, by an alarming and correction module of the network security computer, one or more reports, alarms, and/or blocks, for the deviant engineering modifications to the plurality of programmable logic controllers based on a detected deviant engineering modification,
    wherein the network traffic data collected comprises at least: content of the network traffic data and timing patterns of the network traffic data, and
    wherein comparing comprises:
        comparing, by the network traffic comparison module of the network security computer, content of the network traffic data collected with the content of network traffic data templates stored in the network traffic data storage device; and
        comparing, by the network traffic comparison module of the network security computer, timing patterns of the network traffic data collected with the timing patterns of the network traffic data templates stored in the network traffic data storage device.

2. The method of claim 1, wherein detecting comprises:
    identifying, by the abnormality detection module of the network security computer, any deviant engineering modifications to one or more programmable logic controllers in the plurality of engineering stations
        when the difference between the content of network traffic data collected and the content of network traffic data templates stored in the network traffic data storage device exceeds a first predetermined threshold, and/or
        when the difference between the timing patterns of network traffic data collected and the timing patterns of network traffic data templates stored in the network traffic data storage device exceeds a second predetermined threshold.

3. The method of claim 1, wherein generating comprises:
    generating one or more alarms to an operator of the network security computer when any deviant engineering modifications to the plurality of programmable logic controllers are detected, wherein the one or more alarms comprise: communication via one or more emails, one or more text messages, one or more displays on the network security computer, and one or more alarm displays on the plurality of engineering stations; and
    blocking, by the network security computer, any network traffic associated with the deviant engineering modifications to the plurality of programmable logic controllers when any deviant engineering modifications to the plurality of programmable logic controllers are detected and the sources of the network traffic are identified.

4. A network security computer for identifying deviant engineering modifications to programmable logic controllers, comprising:
    at least one processor, and a non-transitory storage medium storing an operating system, a network security program, and computer executable instructions, when executed on at least one processor, the network security program causes the processor to identify deviant engineering modifications to programmable logic controllers, wherein the network security program comprises:
    a network traffic collection device for collecting network traffic data from a plurality of engineering stations, each engineering station comprising at least one programmable logic controller, wherein the plurality of engineering stations are connected through an industrial automation control network, and wherein the network traffic data comprise streams of machine data generated by the industrial automation control network and technology infrastructure;
    a network traffic data storage device for storing the network traffic data collected, wherein stored network traffic data comprises:
        a first set of network traffic data collected during engineering or design of the plurality of engineering stations, wherein signatures of the first set of network traffic data are collected and stored as network traffic benchmark data templates, and
        a second set of network traffic data collected during operation of the plurality of engineering stations;
    a network traffic comparison module for comparing the first set of network traffic data with the second set of network traffic data;
    an abnormality detection module for detecting any deviant engineering modifications to a plurality of programmable logic controllers in the plurality of engineering stations based on the comparing of the first set of network traffic data with the second set of network traffic data; and an alarming and correction module for generating one or more reports for the deviant engineering modifications to the plurality of programmable logic controllers based on a detected deviant engineering modification, wherein the network traffic data collected comprises at least: content of the network traffic data and timing patterns of the network traffic data, and wherein the network traffic comparison module compares the content of the network traffic data collected with the content of network traffic data templates stored in the network traffic data storage device, and the timing patterns of the network traffic data collected with the timing patterns of the network traffic data templates stored in the network traffic data storage device.

5. The network security computer of claim 4, wherein the abnormality detection module of the network security computer detects any deviant engineering modifications to one or more programmable logic controllers in the plurality of engineering stations when the difference between the content of network traffic data collected and the content of network traffic data templates stored in the network traffic data storage device exceeds a first predetermined threshold, and/or when the difference between the timing patterns of network traffic data collected and the timing patterns of network traffic data templates stored in the network traffic data storage device exceeds a second predetermined threshold.

6. The network security computer of claim 4, wherein one or more alarms are generated and sent to an operator of the network security computer when any deviant engineering modifications to the plurality of programmable logic controllers are detected, wherein the one or more alarms comprise: one or more emails, one or more text messages, one or more display on the network security computer, and one or more alarm display on the plurality of engineering stations; and any network traffic associated with the deviant engineering modifications to the plurality of programmable logic controllers is blocked when any deviant engineering modifications to the plurality of programmable logic controllers are detected and the sources of the network traffic are identified.

7. A computer program product operable on a network security computer, comprising a non-transitory storage medium readable by at least one processor of the network security computer, wherein the non-transitory storage medium stores an operating system, a network security program and computer executable instructions for execution by the processor of the network security computer for performing a method for identifying deviant engineering modifications to programmable logic controllers, the method comprising:

collecting, by a network traffic collection device of the network security computer, network traffic data from a plurality of engineering stations, each engineering station comprising at least one programmable logic controller, wherein the plurality of engineering stations are connected through an industrial automation control network, and wherein the network traffic data comprise streams of machine data generated by the industrial automation control network and technology infrastructure;

storing, by a network traffic data storage device of the network security computer, the network traffic data collected, wherein the storing comprises:
  storing a first set of network traffic data collected during engineering or design of the plurality of engineering stations, wherein signatures of the first set of network traffic data are collected and stored as network traffic benchmark data templates, and
  storing a second set of network traffic data collected during operation of the plurality of engineering stations;

comparing, by a network traffic comparison module of the network security computer, the first set of network traffic data with the second set of network traffic data;

detecting, by an abnormality detection module of the network security computer, any deviant engineering modifications to a plurality of programmable logic controllers in the plurality of engineering stations based on the comparing of the first set of network traffic data with the second set of network traffic data; and generating, by an alarming and correction module of the network security computer, one or more reports for the deviant engineering modifications to the plurality of programmable logic controllers based on a detected deviant engineering modification, wherein the network traffic data collected comprises at least: content of the network traffic data and timing patterns of the network traffic data, and wherein comparing comprises:
  comparing, by the network traffic comparison module of the network security computer, content of the network traffic data collected with the content of network traffic data templates stored in the network traffic data storage device; and
  comparing, by the network traffic comparison module of the network security computer, timing patterns of the network traffic data collected with the timing patterns of the network traffic data templates stored in the network traffic data storage device.

8. The computer program product of claim 7, wherein detecting comprises:
  identifying, by the abnormality detection module of the network security computer, any deviant engineering modifications to one or more programmable logic controllers in the plurality of engineering stations when the difference between the content of network traffic data collected and the content of network traffic data templates stored in the network traffic data storage device exceeds a first predetermined threshold, and/or when the difference between the timing patterns of network traffic data collected and the timing patterns of network traffic data templates stored in the network traffic data storage device exceeds a second predetermined threshold.

9. The computer program product of claim 7, wherein generating comprises:
  generating one or more alarms to an operator of the network security computer when any deviant engineering modifications to the plurality of programmable logic controllers are detected, wherein the one or more alarms comprise: one or more emails, one or more text messages, one or more display on the network security computer, and one or more alarm display on the plurality of engineering stations; and
  blocking, by the network security computer, any network traffic associated with the deviant engineering modifications to the plurality of programmable logic controllers when any deviant engineering modifications to the plurality of programmable logic controllers are detected and the sources of the network traffic are identified.

* * * * *